Feb. 20, 1940.  L. V. WISE  2,191,244

FISHING TACKLE

Original Filed April 1, 1937

Inventor.
Leo V. Wise

By L. F. Randolph
Attorney

Patented Feb. 20, 1940

2,191,244

UNITED STATES PATENT OFFICE 2,191,244

FISHING TACKLE

Leo V. Wise, Detroit, Mich.

Refiled for abandoned application Serial No. 134,447, April 1, 1937. This application March 30, 1939, Serial No. 265,048

5 Claims. (Cl. 43—39)

This application is refiled for abandoned application No. 134,447, filed April 1, 1937.

The invention relates to improvements in artificial bait.

The object of this invention is to provide an attachment for the hooks of a lure that will prevent the barbs becoming entangled in foreign matter; will substantially conceal the hook without preventing a fish from taking the hook; that will be buoyant so that the hook will not hang down from the main body portion of the lure; and which will itself, due to its color and shape, constitute an artificial bait which will attract fish to the hook.

Other objects and advantages of the invention will become apparent from the specification of which the drawing forms a part, and wherein.

Figure 1:
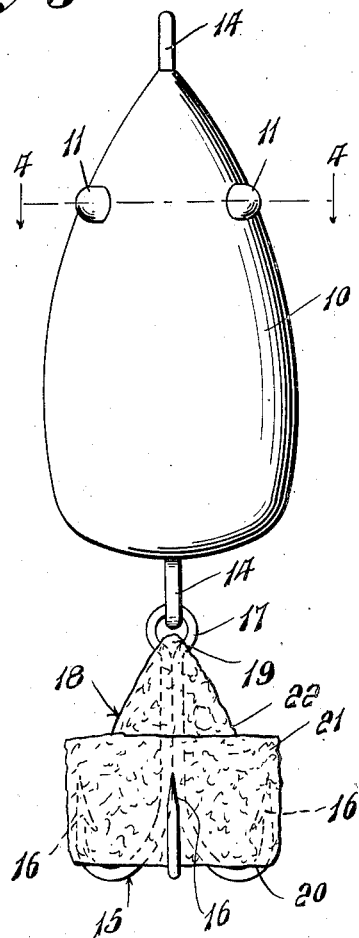
Figure 1 is a top plan view of the device.
Figure 2:
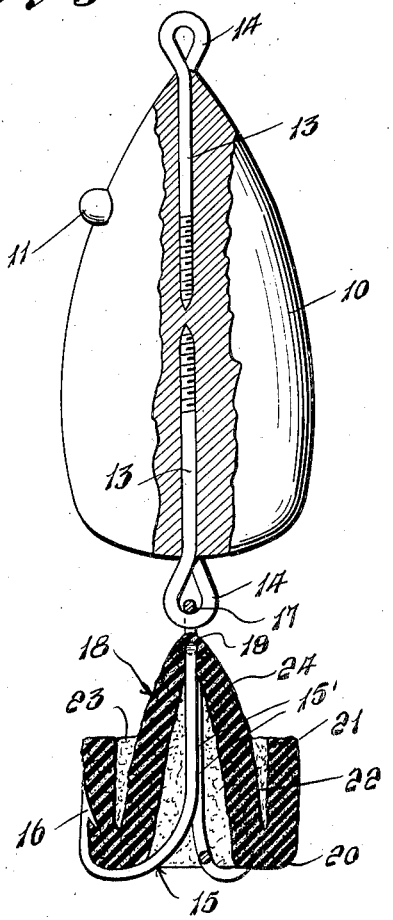
Figure 2 is a side elevational view partly in section of the invention.
Figure 3:
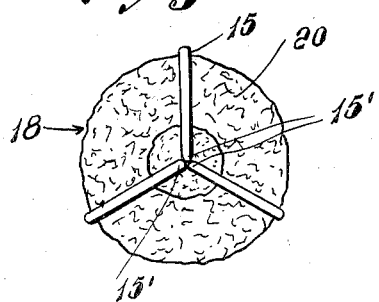
Figure 3 is an end view of the cone shaped member and hook.
Figure 4:
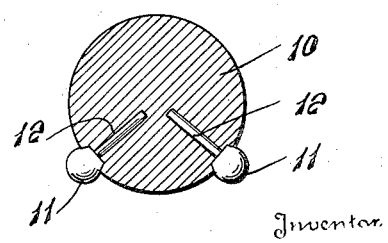
Figure 4 is a cross sectional view on the line 4—4 of Figure 1.

Referring more particularly to the drawing wherein like reference characters designate like or corresponding parts in the different views, 10 designates the main body portion of the lure which is made of wood or other buoyant material. The body 10 is illustrated as shaped to resemble a mouse, but any desired shape can be used, it being understood that the invention is not intended to be limited in this respect. Beads 11 mounted on studs 12 are secured to the body portion 10 to give the effect of eyes. Driven fastenings 13 provided with loops 14 are secured in each end of the body portion 10.

A hook 15 comprising shafts 15', barbs 16, and a loop 17 is connected to the body 10 by the engagement of the loop 17 with the loop 14.

The porous sponge rubber cone shaped member 18 is fastened to the loop 17 at its end 19. The cone is folded upon itself at 20 forming the outer and inner layers 21 and 22 respectively. Between layers 21 and 22 is formed the circumferential V-shaped recess 23. The shafts 15' are substantially concealed within the recess 24 of the cone 18, and the barbs 16 are embedded in portion 21 and held in this position by the pressure of the water in recess 23.

The cone 18 is colored to give the appearance of a piece of bait as it moves through the water. The recess 23 causes part 21 to move outwardly as cone 18 moves through the water, concealing barbs 16. The cone 18 being of porous rubber is sufficiently buoyant to hold the hook on the surface even when not in motion. It is also sufficiently flexible so that a fish in grabbing at the cone 18 will not be prevented from becoming caught on one of the barbs 16.

It is to be understood that only the preferred embodiment of the invention has been shown, the right being reserved to make such changes in the construction as will not depart from the spirit and scope of the invention.

I claim as my invention:

1. An artificial bait comprising a buoyant body portion, a hook secured to one end of said body portion, and a buoyant member secured to said hook, said buoyant member being folded upon itself intermediate of its ends, and the barbs of said hook being embedded in said folded portion.

2. An artificial bait comprising a body portion, a hook secured to said body portion, and a cone shaped member secured to said hook, said cone shaped member being adapted to be folded upon itself intermediate of its ends to cover the shafts of said hook, and the barbs of said hook being adapted to be embedded in said folded portion.

3. An attachment for a fish hook comprising a cone shaped member of porous rubber secured to said hook, said cone shaped member being adapted to substantially conceal said hook, the barbs of said hook being adapted to be embedded in the cone shaped member, and said cone shaped member being adapted to protect said hook from foreign matter, and to provide a lure to attract fish.

4. An artificial bait comprising a body portion, a hook secured to said body portion, and a cone shaped member of porous rubber mounted on said hook, said cone shaped member being folded upon itself intermediate of its ends, the barbs of said hook being embedded in said folded portion, and said cone shaped member being sufficiently flexible to not prevent a fish being hooked by one of said barbs.

5. An artificial bait comprising a buoyant body portion having a hook secured thereto, and a cone shaped member of porous rubber mounted on said hook, said cone shaped member being folded upon itself intermediate of its ends, the barbs of said hook being adapted to be embedded in the exposed side of said folded portion, and the cone shaped member being adapted to cooperate with the body portion to make the lure buoyant and to prevent foreign matter becoming entangled in the barbs.

LEO V. WISE.